(12) United States Patent
Koskinen et al.

(10) Patent No.: US 7,590,596 B2
(45) Date of Patent: Sep. 15, 2009

(54) CHARGING SYSTEM AND METHOD FOR HANDLING SERVICES WITHIN THIS SYSTEM AND ENTITIES THEREOF

(75) Inventors: Juha-Pekka Koskinen, Hämeenlinna (FI); Anne Närhi, Tampere (FI); Erkki Riekkola, Vantaa (FI); Heikki Pälä, Tampere (FI)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 11/518,990

(22) Filed: Sep. 12, 2006

(65) Prior Publication Data

US 2007/0244832 A1  Oct. 18, 2007

(30) Foreign Application Priority Data

Apr. 12, 2006  (EP) .................... 06112573

(51) Int. Cl.
*H04M 15/00* (2006.01)
(52) U.S. Cl. ....................................... 705/40
(58) Field of Classification Search .......... 705/1–45; 379/114.28; 713/2; 455/406, 455; 707/9; 717/106
See application file for complete search history.

(56) References Cited

U.S. PATENT DOCUMENTS

| | | | |
|---|---|---|---|
| 6,240,091 B1 | 5/2001 | Ginzboorg et al. | |
| 7,260,193 B2 * | 8/2007 | Zackrisson et al. | 379/114.28 |
| 2002/0116456 A1 * | 8/2002 | Morita | 709/203 |
| 2004/0247100 A1 * | 12/2004 | Hakala et al. | 379/114.01 |
| 2005/0136890 A1 * | 6/2005 | Lippelt | 455/406 |
| 2006/0008063 A1 * | 1/2006 | Harnesk et al. | 379/114.01 |
| 2007/0274483 A1 * | 11/2007 | Shapiro | 379/114.12 |
| 2008/0010118 A1 * | 1/2008 | Howell et al. | 705/14 |

FOREIGN PATENT DOCUMENTS

WO   WO 01/74018 A1   10/2001
WO   WO 2004/036825 A1   4/2004

OTHER PUBLICATIONS

Mobile Entertainment: Not listening—May 25, 2006—New Media Age, p. 35.*

(Continued)

*Primary Examiner*—Mary Cheung
*Assistant Examiner*—Tien C Nguyen
(74) *Attorney, Agent, or Firm*—Harrington & Smith, PC

(57) ABSTRACT

A method is provided for handling a service of a predetermined type within a charging system comprising a server and a client. The method includes receiving, at the client, a request for the service of the predetermined type from a terminal, transmitting said request from the client to the server in a charging control request in which the service of the predetermined type is indicated, checking, at said server, whether the requested service of the predetermined type can be granted, and if granted, responding, by said server, with a control message to the client, and measuring, by the client, the usage of resources consumed by the granted service in response to said control message, and reporting the measured used resources for the service at a predetermined condition from the client to the server in a report message. The present invention relates also to a corresponding system and network entities.

24 Claims, 4 Drawing Sheets

OTHER PUBLICATIONS

ETSI TS 132 299 V7.0.0, "*Universal Mobile Telecommunications System (UMTS); Telecommunication Management; Charging Management; Diameter Charging Applications (3GPP TS 32.299 version 7.0.0 Release 7)*", Dec. 2005, pp. 1-89.

Hakala, H. et al., "*Diameter Credit-Control Application*", Request for Comments 4006, Aug. 2005, pp. 1-114.

International Search Report. PCT/IB2007/051187 filed Apr. 3, 2007.

\* cited by examiner

CHARGING SYSTEM AND METHOD FOR HANDLING SERVICES WITHIN THIS SYSTEM AND ENTITIES THEREOF

FIELD OF THE INVENTION

The present invention relates to a charging system configured to handle a service of a predetermined type as well as a client and a server of such charging system and a method for handling a service of a predetermined type within the charging system.

BACKGROUND OF THE INVENTION

Due to the increasing speed of wireless and wired communications, the offers for contents to be downloaded on a terminal of an end user, for example a personal computer, a PDA (personal digital assistant) or a mobile phone etc., have highly increased. These contents can be for example pictures, melodies, songs, games, all kind of software or other data and the like. With the increasing offer of such contents, there also arises the demand for a reliable charging system that can handle various types of services and different charging methods. In general, a service can be a call between end users, a communication session between an end user and a server to download or upload content, or any other interaction between a terminal and a third party.

For the purpose of the present invention to be described herein below, it should be noted that

- a terminal may for example be any kind of communication device, such as wireless or wired devices, e.g. personal computers, mobile phones or the like, irrespective of a specific standard to which these conform as long as they are compatible with the charging system;
- for the charging system any suitable protocol for operating/message exchange is possible; only as an example it is noted that Diameter as a follow-up of RADIUS (Remote Authentication Dial-In User Service) is particularly suitable to be used with the present invention;
- method steps likely to be implemented as software code portions and being run using a processor at one of the server/client entities, are software code independent and can be specified using any known or future developed programming language as long as the functionality defined by the method steps is preserved;
- generally, any method step is suitable to be implemented as software or by hardware without changing the idea of the present invention in terms of the functionality implemented;
- method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc., using for example ASIC components or DSP components, as an example;
- devices can be implemented as individual devices, but this does not exclude that they are implemented in a distributed fashion throughout the system, as long as the functionality of the device is preserved.

As a specific example only, reference is made to document RFC4006 which specifies a protocol for Diameter application that can be used to implement credit-control for a variety of end user services such as network access, Session Initiation Protocol (SIP) services, messaging services, and download services. Upon request of an end user, a client transmits a service request to a server. The server responds to the request by sending an answer, thereby reserving quota for the requested service from the end user's account. Then the client allows service delivery to the end user and starts monitoring the usage of the granted quota. When the quota granted to the user has expired or the service has been successfully delivered or terminated, the client sends a message to the server reporting the used amount. Then, the server deducts the used amount from the end user's account.

However, a problem arises if the service requested by the end user is of a predetermined type such as free-of-charge. In this case, the server will not reserve any quota for the requested service, but will issue an answer including a code indicating that credit-control is not applicable for the requested service. In this instance, the client will not report to the charging system anymore and if there is possibility that the service can change from free-of-charge to chargeable, there could probably be credit loss for an operator.

In order to avoid such situation, the server would need to issue a request for re-authorization to the client. This would mean that, for each session, the server would need to keep track of the possibility that the service can change from free-of-charge to chargeable. However, this would impose a large processing and monitoring burden on the server.

Also in cases in which the server grants a requested service without reserving any quota, the charging method is not indicated and usage of service, if reported, can not be allocated to a specific charging method.

SUMMARY OF THE INVENTION

Accordingly, it is an object of the present invention to provide a charging system configured to handle a service of a predetermined type as well as a client and a server comprised in this charging system and a method for handling a service of a predetermined type within the charging system that solves the above described problems.

According to the present invention, this object is, for example, achieved by a method for handling a service of a predetermined type within a charging system comprising a server and a client, the method comprising the steps of:

- receiving, at the client, a request for the service of the predetermined type from a terminal,
- transmitting said request from the client to the server in a charging control request in which the service of the predetermined type is indicated,
- checking, at said server, whether the requested service of the predetermined type can be granted,
- and if granted,
  - responding, by said server, with a control message to the client, and
  - measuring, by the client, the usage of resources consumed by the granted service in response to said control message, and
  - reporting the measured used resources for the service at a predetermined condition from the client to the server in a report message.

According to advantageous further refinements of the invention as defined under the above aspect

- said service of the predetermined type is a free-of-charge service;
- said free-of-charge service is free for a predetermined time or is free for a predetermined data volume, and said free-of-charge service excludes one of the following services an advertising service, a recharging service, a roaming service, a subscriber service, a downloading sample service, or a bonus/reward service;

said control message indicates a type of resources used for the service to be measured;

said type of resources used for the service to be measured comprises at least one of time and data volume of service;

said predetermined condition is a predetermined period of time upon receipt of the control message by the client;

said predetermined condition is a predetermined time of day upon receipt of the control message by the client;

the method comprises further the step of setting the predetermined condition by the server, depending on the service of the predetermined type;

the method comprises further a step of determining, at the server, upon receipt of the report message, whether the service of the predetermined type has changed or will change to a different type;

the method comprises further a step of changing a mode of handling the service within the charging system to a mode for handling the service of the different type.

According to the present invention, this object is, for example, additionally achieved by a charging system configured to handle a service of a predetermined type and comprising a server and a client, the system comprising:

a receiver/receiver means, at the client, configured to receive a request for the service of the predetermined type from a terminal, a transmitter/transmitter means configured to transmit said request from the client to the server in a charging control request in which the service of the predetermined type is indicated, a checking unit, at said server, configured to check whether the requested service of the predetermined type can be granted, a responding unit, at said server, configured to respond with a control message to the client, and a measuring unit, at the client, configured to measure the usage of resources consumed by the granted service in response to said control message, and a reporting unit configured to report the measured used resources for the service at a predetermined condition from the client to the server in a report message.

According to advantageous further refinements of the invention as defined under the above aspect said service of the predetermined type is a free-of-charge service;

said free-of charge service is free for a predetermined time or is free for a predetermined data volume;

said responding unit is configured to generate said control message indicating a type of resources used for the service to be measured;

in said control message, said type of resources used for the service to be measured comprises at least one of time and data volume of service;

said predetermined condition is a predetermined period of time upon receipt of the control message by the client;

said predetermined condition is a predetermined time of day upon receipt of the control message by the client;

the server further comprises a setting unit configured to set the predetermined condition depending on the service of the predetermined type;

the server further comprises a determination unit configured to determine, upon receipt of the report message, whether the service of the predetermined type has changed or will change to a different type;

the server further comprises a changing unit configured to change a mode of handling the service within the charging system to a mode for handling the service of the different type.

According to the present invention, this object is, for example, further achieved by a client for handling a service of a predetermined type within a charging system, the client comprising:

a receiver configured to receive a request for the service of the predetermined type from a terminal, a transmitter configured to transmit said request to the server in a charging control request in which the service of the predetermined type is indicated, a measuring means/unit configured to measure the usage of resources consumed by the granted service in response to a control message, and a reporting means/unit configured to report the measured used resources for the service at a predetermined condition to the server in a report message.

According to advantageous further refinements of the invention as defined under the above aspect said predetermined condition is a predetermined period of time upon receipt of the control message by the client;

said predetermined condition is a predetermined time of day upon receipt of the control message by the client.

According to the present invention, this object is, for example, also achieved by a server for handling a service of a predetermined type within a charging system, the server comprising:

a checking unit configured to check whether a requested service of the predetermined type can be granted, and a responding unit configured to respond with a control message to a client.

According to advantageous further refinements of the invention as defined under the above aspect said responding unit is configured to generate said control message indicating a type of resources used for the service to be measured;

in said control message, said type of resources used for the service to be measured comprises at least one of time and data volume of service;

the server further comprises a setting unit configured to set the predetermined condition depending on the service of the predetermined type;

the server further comprises a determination unit configured to determine, upon receipt of the report message, whether the service of the predetermined type has changed or will change to a different type;

the server further comprises a changing unit configured to change a mode of handling the service within the charging system to a mode for handling the service of the different type.

According to the present invention, when a service requested by an end user is of a predetermined type such as free-of-charge, the server is able to instruct the client to measure and report the usage of the service without reserving any quota. That means after a certain time, at a certain time of day or after a certain data amount, the client reports the usage of the service. Therefore, the server does not need to keep track of the possibility of services changing from free-of-charge to chargeable, but the client is made to report by itself.

Thus, the present invention removes the above mentioned drawbacks inherent to the prior art.

BRIEF DESCRIPTION OF THE DRAWINGS

The present invention is described herein below with reference to the accompanying drawings, wherein.

DESCRIPTION OF THE EMBODIMENT

The present invention will be described herein below with reference to the accompanying drawings illustrating an embodiment thereof.

Figure 1:
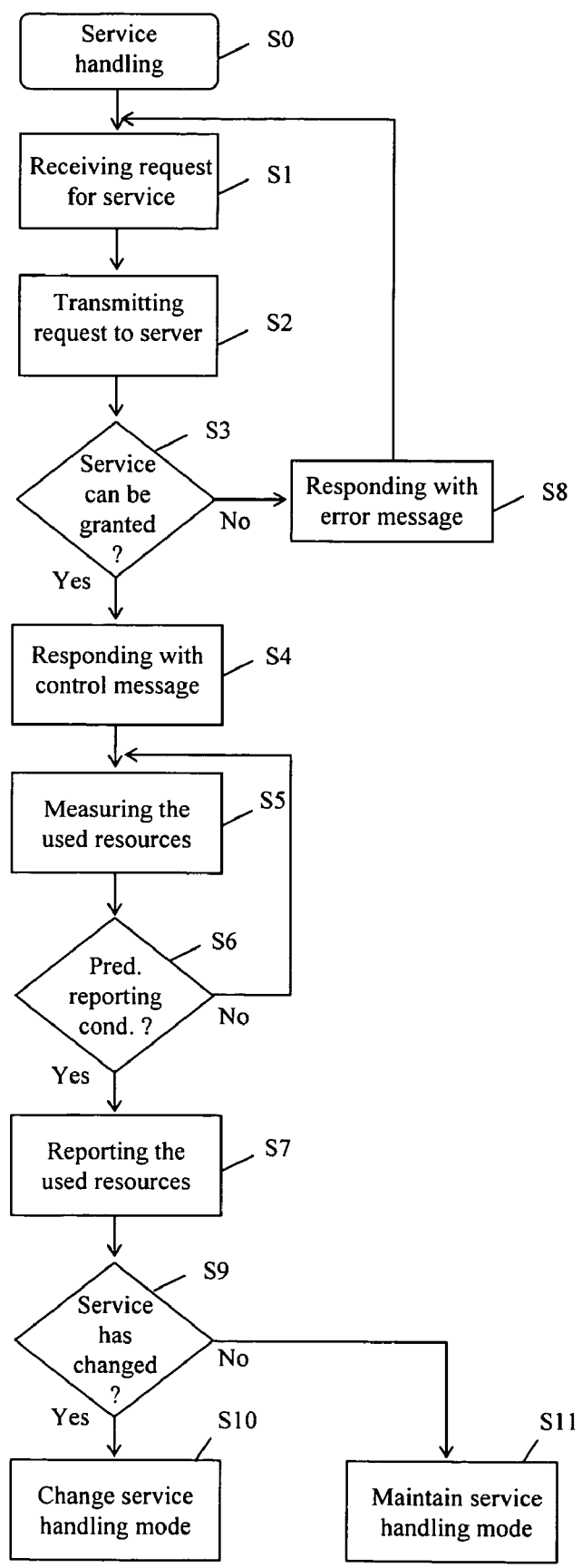
FIG. 1 is a flowchart showing a charging process of a free-of-charge service as an embodiment of the present invention.

FIG. 1 is a flowchart showing a charging process of a free-of-charge service as an embodiment of the present invention.

A free-of-charge service is an example of a service of a predetermined type. The invention is, however, not limited to such service type. The charging system and method according to the present invention could also be applied to other predetermined types of services such as non-online charging methods for so-called post-paid users, or the like.

According to FIG. 1, the flow of service handling starts in step S0, whereafter in the first step S1, the client receives a service request from a terminal. In step S2, the client transmits this service request to the server in a charging control request in which the requested service of, in this example, a free-of-charge type is indicated. Upon receipt of the charging control request, in step S3, it is checked, at the server, if the requested service can be granted or not. If the requested service can not be granted, for example because the request contains an incorrect rating input (i.e. the cost of the service has been determined incorrect), the server sends in step S8 an error message to the client and the service has to be requested again.

If in step S3, it is determined that the service can be granted, the server responds to the client in step S4 with a control message. This control message contains information about the type of resources that should be measured by the client, for example, time or data volume. The control message also contains information about the predetermined condition at which the client has to report to the server again. The predetermined condition is set by the server in the control message and can, for example, be a certain time period upon receipt of the control message by the client or a certain time of day upon receipt of the control message by the client or a certain data amount that has been consumed by the service.

After receipt of the control message from the server at the client, the service delivery to the terminal that has requested that service is started. Also, in step S5, the client starts measuring the used resources as indicated by the server in the control message. Next, in step S6, it is determined whether the predetermined condition has occurred, e.g. a certain time period has expired, a certain time of day has been reached, or a certain data amount has been consumed. If the predetermined condition has not occurred, the service delivery and also the measuring of the used resources is continued and the flow returns to step S5. If it is otherwise determined in step S6, that the predetermined condition has occurred, the client, in step S7, reports the measured resources for the service to the server in a report message. Under certain circumstances, the service delivery might then be terminated, e.g. testing a service for 24 hours/1 Mbyte, then service disrupted upon lapse of time/volume. However, it need not necessarily be terminated upon reporting used resources.

Having received the report message from the client, the server determines in step S9 if the requested service is still free-of-charge or has changed or will change to a different type, e.g. to a chargeable type. Therefore, the server monitors the validity times of service tariffs. In the simplest case, the server determines the change of the tariff (e.g. a change from free-of-charge to chargeable) based on clock time. In another case, the change of the tariff could be triggered by the client upon change of a certain condition, e.g. the service requesting entity leaving a predetermined home location or the like.

If it is determined, that the service is still free-of-charge, the server maintains the current handling mode in step S11. If in step S9 the server determines that the service has changed or will change to a different type, e.g. a chargeable type, the server will in step S10 change the handling mode to a mode suitable for the different type of the requested service, e.g. in a chargeable mode, in which quota will be reserved for the requested service.

Next, according to FIG. 2, a signaling diagram of the charging process of the free-of-charge service in this exemplary embodiment will be explained.

Figure 2:
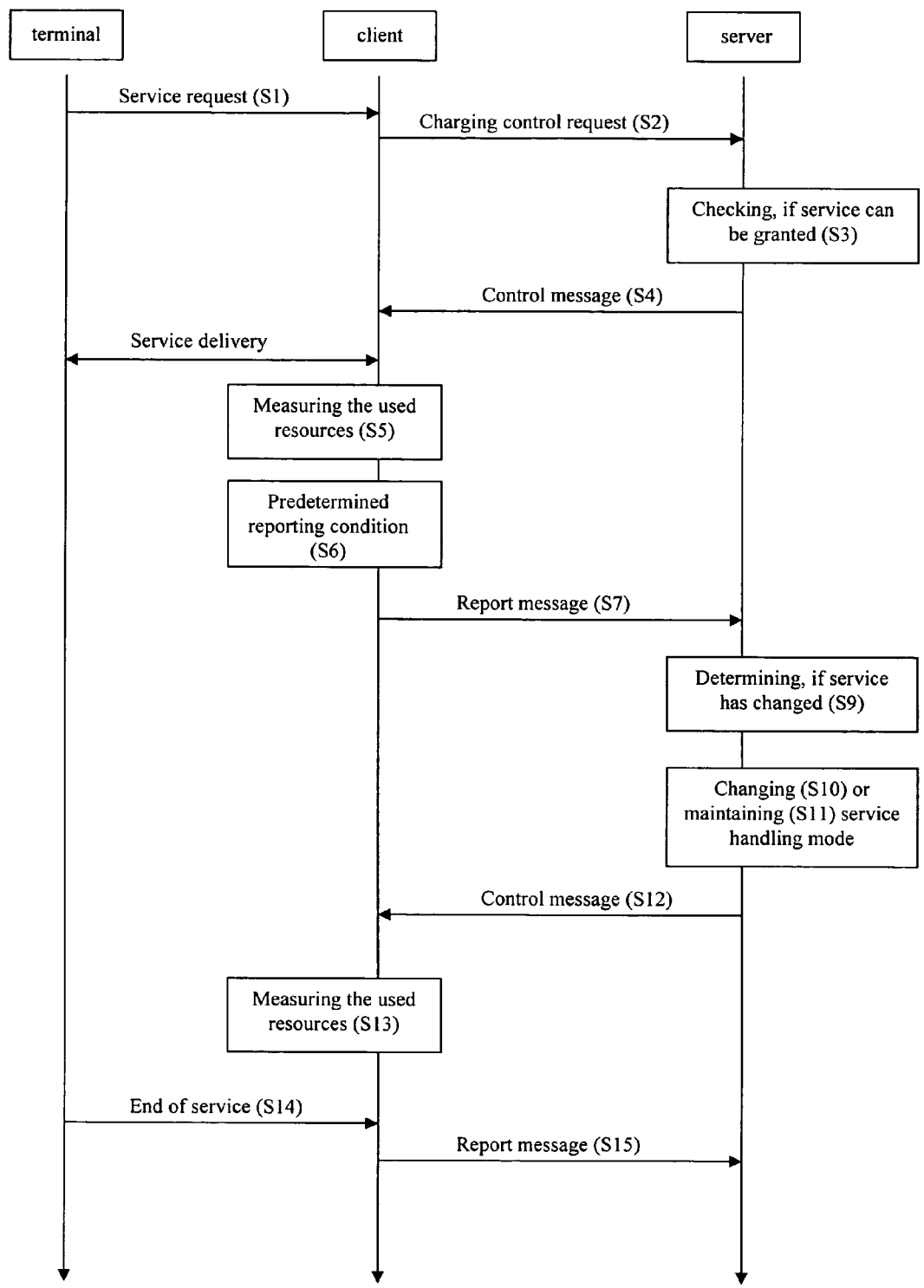
FIG. 2 is a signaling diagram of the charging process of the free-of-charge service in the embodiment.

In the signaling diagram of FIG. 2, there are shown the messages that are sent between a terminal, a client and a server and also the processing steps processed/performed by the client and the server while performing the charging process of the free-of-charge service according to the embodiment of the present invention. In FIG. 2, step S1 to step S11 are the same as in FIG. 1 and are therefore described only shortly.

It is shown in FIG. 2 that in step S1 a client receives a service request from a terminal and in step S2 transmits the request in a charging control request to the server. In step S3 the server checks if the service can be granted. If the service can be granted, the server sends, in step S4, a control message to the client.

Upon receipt of the control message from the server, the client, in step S5, starts measuring of the used resources. If in step S6 the predetermined reporting condition has expired or has been reached, the client sends a report message to the server (step S7) and the server determines whether the service has changed (step S9). According to the result of the determination in step S9, the service handling mode is changed (step S10) or maintained (step S11).

If the mode has been maintained, the server sends in step S12 a further control message to the client in which again the type of resource to be measured is indicated and the predetermined condition is set. After receipt of the further control message, the client continues with the service delivery and starts again in step S13 the measuring of the used resources. If the terminal wishes to terminate the service delivery, it sends in step S14 a message indicating the end of service to the client and the client reports in step S15 the termination request as well as the measured resources to the server.

In case that in step S9 it has been determined that the service has changed, the service handling mode will be changed in step S10 and the server will issue an appropriate control message, similar as in step S12, according to the type of service. This is, however, not shown in FIG. 2 in further detail.

Figure 3:
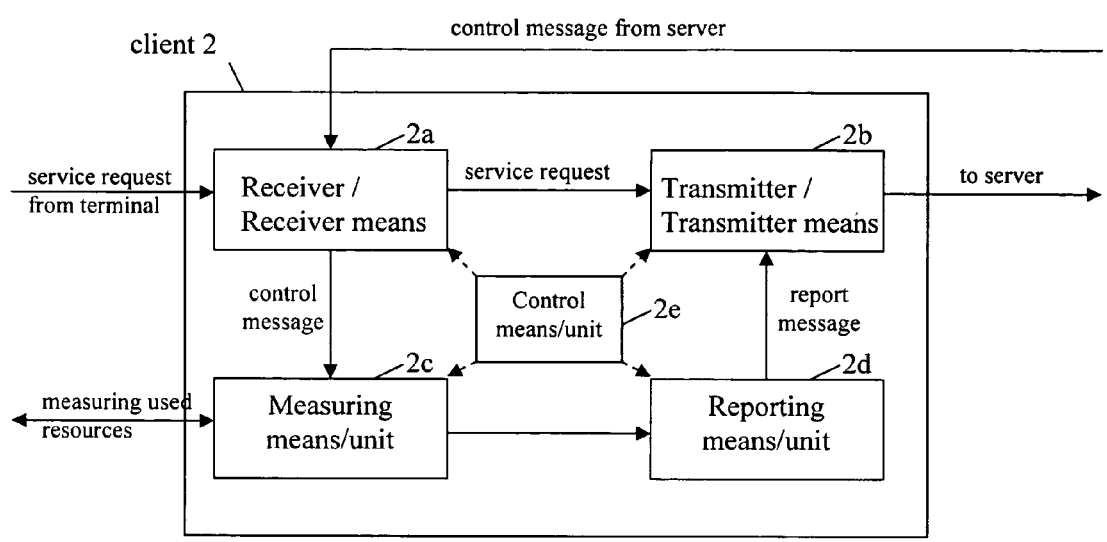
FIG. 3 is a block diagram of a client in the embodiment.

FIG. 3 shows a block diagram of a client of the charging system according to the embodiment of the present invention.

As shown in FIG. 3, the client 2 comprises a receiver/receiver means 2a that receives the requests from the terminal and the control message from the server. The receiver/receiver means 2a is connected to a measuring means/unit 2c, which measures the resources used by the service. The measuring means/unit obtains from the receiver/receiver means 2a information about the type of resource that should be measured, which information is contained in the control message. The measuring means/unit 2c is also connected to a reporting means/unit 2d and provides the reporting means/unit 2d with information about the measured used resources. The reporting means/unit 2d is in turn connected to a transmitter/transmitter means 2b that transmits the report message from the reporting means to the server. The processing of the request from the terminal, of the control message from the server, of the measuring of the resources, as well as the determination, if the predetermined condition has occurred, is executed in a control means/unit 2e of the client. The control means/unit 2e is connected to the receiver/receiver means 2a, the transmitter/transmitter means 2b, the measuring means/unit 2c and the reporting means/unit 2d.

Figure 4:
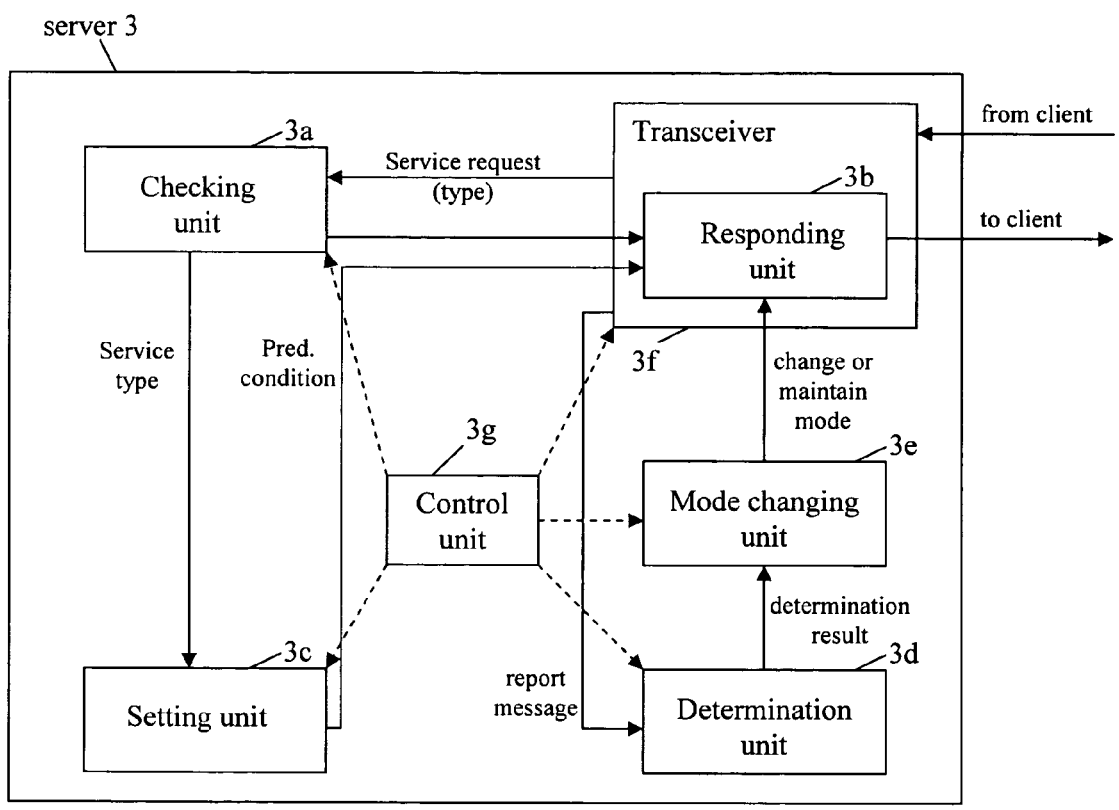
FIG. 4 is a block diagram of a server in the embodiment.

FIG. 4 shows a block diagram of a server of the charging system according to the embodiment of the present invention.

As can be seen from FIG. 4, the server comprises a transceiver 3f for receiving a service request from the client 2. The transceiver 3f forwards the request, that indicates the type of the requested service to a checking unit 3a, that is connected to the transceiver 3f. The checking unit 3a checks if a service of a predetermined type requested by the client can be granted. The checking unit 3a is further connected to a setting unit 3c. The setting unit 3c obtains information about the requested service type and sets a predetermined condition in the control message depending on the type of the requested service. The setting unit 3c provides a responding unit 3b, that is connected to the setting unit 3c, with the predetermined condition and the responding unit 3b sends a control message to the client 2. The responding unit 3b is illustrated as a part of the transceiver 3f. Further connected to the transceiver 3f is a determination unit 3d. The determination unit 3d obtains a report message from the transceiver and determines whether the service of the predetermined type has changed or will change. The determination unit 3d forwards the determination result to a mode changing unit 3e, that is connected to the determination unit 3d. Based on the result of the determination unit 3d, the mode changing unit 3e changes or maintains the charging mode. The mode changing unit is further connected to the responding unit 3b and provides the responding unit 3b with information, if the mode is changed or maintained and the responding unit 3b sends a control message to the client. The processing performed by the checking unit 3a, the responding unit 3b, the setting unit 3c, the determination unit 3d, the mode changing unit 3e and the transceiver 3f is controlled by a control unit 3g.

According to the present invention described above, a predetermined service such as a free-of-charge service can be handled appropriately in the above-described charging system. The server checks if a free-of-charge service requested by a client can be granted and issues a control message instructing the client to measure the used resources for a predetermined condition. If the predetermined condition has expired or has been reached, the client reports the used resources in a report message and the server can determine whether the service is still free-of-charge. In this way, there is no possible loss for an operator due to changing of a service from free-of-charge to chargeable.

Specific application modes of the present invention are subsequently described with reference to a scenario, in which the present invention is applied to modify RFC4006. The modification of RFC4006 then e.g. resides in the following.

In a Diameter-credit-control-application according to RFC4006, it is only specified that when a service is free-of-charge, the server issues a result-code 4011 DIAMETER_CREDIT_CONTROL_NOT_APPLICABLE to the client. This result-code means, that the server determines that the service can be granted to the end user, but that no further credit-control is needed for the service. Therefore, in such a case, the client will not report to the server anymore, resulting in the above-described drawbacks.

Now, according to a first aspect of the present invention, in case of a free-of-charge service, the server issues a new result-code 1XXX FREE_OF_CHARGE_SERVICE to the client. That is, the control message (see step S4 in FIG. 1) contains the new result-code. When receiving this result-code, the client knows that the service usage must be reported, even if the server does not allocate any units (quota) to the client. The reporting period is defined in validity-time AVP (attribute value pair).

According to the present invention, when the server detects that a requested service is free-of-charge, the server sets the result-code AVP in the control message, e.g. so-called credit-control answer (CCA) message, to 1XXX FREE_OF_CHARGE_SERVICE. The credit-control answer (CCA) message also contains the Granted-Service-Unit AVP. The Granted-Service-Unit AVP includes the Unit-Type AVP and in this Unit-Type AVP it is indicated, what type of resource should be measured, e.g. time, money, data volume or the like. According to result-code 1XXX FREE_OF_CHARGE_SERVICE, no quota is given to the client, but Validity-Time as an example of a predetermined condition is set to control the reporting period (alternatively, a validity data volume can be set). The Validity-Time AVP is also included in the credit-control answer (CCA) message from the server to the client.

When the client receives the control message, e.g. the credit-control answer (CCA) message, from the server containing result-code 1XXX FREE_OF_CHARGE_SERVICE, the client measures the usage of the indicated unit type. When the Validity-Time as an example of the predetermined condition expires, the client sends a report message, e.g. so-called credit-control-request (CCR) message, containing information about the used units. Upon receipt of the report message, e.g. the new credit-control-request (CCR) message from the client, the server checks if the service is still free-of-charge or if the tariff will change within a predefined time period. If the service has changed or will change within a predefined time period to chargeable, the server changes the credit-control mode to a chargeable mode.

According to a second aspect of the present invention, the server uses a new AVP CC-Reported-Charging-Method inside the Granted-Service-Unit AVP to identify free-of-charge charging methods. That is, the control message contains the new AVP CC-Reported-Charging-Method. The CC-Reported-Charging-Method identifies service usage, that needs to be reported and the reporting period is set in Validity-Time AVP as an example of a predetermined condition. Also, validity-data-volume could be used here as a predetermined condition.

The Granted-Service-Unit AVP including the new AVP CC-Reported-Charging-Method according to the second aspect of the present invention is for example defined as follows.

Granted-Service-Unit ::=<AVP Header: 431>
[Tariff-Time-Change]
[CC-Time]

[CC-Money]
[CC-Total-Octets]
[CC-Input-Octets]
[CC-Output-Octets]
[CC-Service-Specific-Units]
*[CC-Reported-Charging-Method]
*[AVP]

Possible values of the new AVP CC-Reported-Charging-Method inside the Granted-Service-Unit AVP are the same as of CC-Unit-Type AVP:
TIME 0
MONEY 1
TOTAL-OCTETS 2
INPUT-OCTETS 3
OUTPUT-OCTETS 4
SERVICE-SPECIFIC-UNITS 5

According to the second aspect of the invention, when the server detects a free-of-charge charging method, instead of defining a quota inside the Granted-Service-Unit, the CC-Reported-Charging-Method AVP included in the Granted-Service-Unit is contained in the control message to identify the free-of-charge charging method. The unit type to be measured is indicated as in the CC-Unit-Type AVP. The same operation can be applied, regardless of whether there are one or several free-of-charge methods. For non-free charging methods, the quota is indicated as specified in RFC4006.

To control the reporting period, the Validity-Time as an example of a predetermined condition is set as usually, taking into account the Validity-Time of the tariff being applied.

When the client receives a control message, e.g. a so-called credit-control answer (CCA) message, with the Granted-Service-Unit including the CC-Reported-Charging-Method AVP, it measures the usage of the indicated unit type. When the predetermined condition, e.g. Validity-Time expires, or the quota given to non-free charging methods has expired, the client sends a report message, e.g. a credit-control request (CCR) message, to the server, containing information about the Used-Service-Units, that is, the used resources.

The same mechanism may be used by the server, if the service usage needs to be collected for some charging methods.

Although the invention has been described by means of a free-of-charge service as an embodiment, the invention is not limited to free-of-charge services but refers also to various other charging methods, e.g. a charging method where only a report of the usage would be required but no quota is given to the client, or for post-paid user services, or the like.

In view of the foregoing description it will be evident to a person skilled in the art that various modifications may be made within the scope of the invention.

As described herein before, the present invention discloses a method for handling a service of a predetermined type within a charging system comprising a server and a client.

The method comprises the steps of receiving, at the client, a request for the service of the predetermined type from a terminal, transmitting said request from the client to the server in a charging control request in which the service of the predetermined type is indicated, checking, at said server, whether the requested service of the predetermined type can be granted, and if granted, responding, by said server, with a control message to the client, and measuring, by the client, the usage of resources consumed by the granted service in response to said control message, and reporting the measured used resources for the service at a predetermined condition from the client to the server in a report message. The present invention relates also to a corresponding system and network entities.

The invention claimed is:

1. A method, comprising:
   receiving, at a client, a request for a service of a predetermined type from a terminal;
   transmitting said request from the client to a server in a charging control request in which the service of the predetermined type is indicated;
   measuring, by the client, a usage of resources consumed by a granted service in response to a control message; and
   reporting the measured used resources for the service at a predetermined condition from the client to the server in a report message,
   wherein said service of the predetermined type is a free-of-charge service, and
   wherein said free-of-charge service excludes one of the following services an advertising service, a recharging service, a roaming service, a subscriber service, a downloading sample service, or a bonus/reward service.

2. A method according to claim 1, wherein
   said free-of charge service is free for a predetermined time or is free for a predetermined data volume.

3. A method according to claim 1, wherein
   said control message indicates a type of resources used for the service to be measured.

4. A method according to claim 3, wherein
   said type of resources used for the service to be measured comprises at least one of time and data volume of service.

5. A method according to claim 1, wherein said predetermined condition is a predetermined period of time upon receipt of the control message by the client.

6. A method according to claim 1, wherein said predetermined condition is a predetermined time of day upon receipt of the control message by the client.

7. An apparatus, comprising:
   a receiver configured to receive a request for a service of a predetermined type from a terminal;
   a transmitter configured to transmit said request to a server in a charging control request in which the service of the predetermined type is indicated;
   a measuring unit configured to measure a usage of resources consumed by a granted service in response to a control message; and
   a reporting unit configured to report the measured used resources for the service at a predetermined condition to the server in a report message,
   wherein said service of the predetermined type is a free-of-charge service, and
   wherein said free-of-charge service exclude one of the following services an advertising service, a recharging service, a roaming service, a subscriber service, a downloading sample service, or a bonus/reward service.

8. An apparatus according to claim 7, wherein said predetermined condition is a predetermined period of time upon receipt of the control message by the apparatus.

9. An apparatus according to claim 7, wherein said predetermined condition is a predetermined time of day upon receipt of the control message by the apparatus.

10. An apparatus, comprising:
    a checking unit configured to check whether a requested service of a predetermined type can be granted; and
    a responding unit configured to respond with a control message to a client,
    wherein said service of the predetermined type is a free-of-charge service, and advertising service, a recharging service, a roaming service, a subscriber service, a downloading sample service, or a bonus/reward service.

11. An apparatus according to claim 10, wherein said responding unit is further configured to generate said control message indicating a type of resources used for the service to be measured.

12. An apparatus according to claim 11, wherein in said control message, said type of resources used for the service to be measured comprises at least one of time and data volume of service.

13. An apparatus according to claim 10, further comprising:
a setting unit configured to set a predetermined condition depending on the service of the predetermined type.

14. An apparatus according to claim 10, further comprising:
a determination unit configured to determine, upon receipt of the report message, whether the service of the predetermined type has changed or will change to a different type.

15. An apparatus according to claim 10, further comprising:
a changing unit configured to change a mode of handling the service within the charging system to a mode for handling the service of a different type.

16. A computer program embodied on a computer readable medium, the computer program being configured to control a processor to perform:
receiving, at a client, a request for a service of a predetermined type from a terminal;
transmitting said request from the client to a server in a charging control request in which the service of the predetermined type is indicated;
measuring, by the client, a usage of resources consumed by a granted service in response to a control message; and
reporting the measured used resources for the service at a predetermined condition from the client to the server in a report message,
wherein said service of the predetermined type is a free-of-charge service, and
wherein said free-of-charge service excludes one of the following services an advertising service, a recharging service, a roaming service, a subscriber service, a downloading sample service, or a bonus/reward service.

17. An apparatus, comprising:
receiver means for receiving a request for a service of a predetermined type from a terminal;
transmitter means for transmitting said request to a server in a charging control request in which the service of the predetermined type is indicated;
measuring means for measuring a usage of resources consumed by a granted service in response to a control message; and
reporting means for reporting the measured used resources for the service at a predetermined condition to the server in a report message,
wherein said service of the predetermined type is a free-of-charge service, and
wherein said free-of-charge service excludes one of the following services an advertising service, a recharging service, a roaming service, a subscriber service, a downloading sample service, or a bonus/reward service.

18. A method, comprising:
checking, at a processor, whether a requested service of a predetermined type can be granted; and
responding, by a processor, with a control message to a client,
wherein said service of the predetermined type is a free-of-charge service, and
wherein said free-of-charge service excludes one of the following services an advertising service, a recharging service, a roaming service, a subscriber service, a downloading sample service, or a bonus/reward service.

19. A method according to claim 18, further comprising:
setting the predetermined condition, depending on the service of the predetermined type.

20. A method according to claim 18, further comprising:
determining, upon receipt of the report message, whether the service of the predetermined type has changed or will change to a different type.

21. A method according to claim 20, further comprising:
changing a mode of handling the service within a charging system to a mode for handling the service of the different type.

22. A method according to claim 18, further comprising:
generating said control message indicating a type of resources used for the service to be measured.

23. A method according to claim 22, wherein in said control message, said type of resources used for the service to be measured comprises at least one of time and data volume of service.

24. A computer program embodied on a computer readable medium, the computer program being configured to control a processor to perform:
checking whether a requested service of a predetermined type can be granted; and
responding with a control message to a client,
wherein said service of the predetermined type is a free-of-charge service, and
wherein said free-of-charge service excludes one of the following services an advertising service, a recharging service, a roaming service, a subscriber service, a downloading sample service, or a bonus/reward service.

* * * * *

UNITED STATES PATENT AND TRADEMARK OFFICE
CERTIFICATE OF CORRECTION

PATENT NO. : 7,590,596 B2  Page 1 of 1
APPLICATION NO. : 11/518990
DATED : September 15, 2009
INVENTOR(S) : Koskinen et al.

It is certified that error appears in the above-identified patent and that said Letters Patent is hereby corrected as shown below:

In Claim 10: Column 10, line 65, after "free-of-charge service, and" insert --wherein said free-of-charge service excludes one of the following services an--.

Signed and Sealed this

Twenty-fourth Day of November, 2009

David J. Kappos
*Director of the United States Patent and Trademark Office*